United States Patent [19]

Allen

[11] Patent Number: 4,860,971
[45] Date of Patent: Aug. 29, 1989

[54] EMERGENCY EGRESS FIXED ROCKET PACKAGE

[75] Inventor: Margaret A. Allen, Huntington Beach, Calif.

[73] Assignee: The United States of America as represented by the Administrator of the National Aeronautics and Space Administration, Washington, D.C.

[21] Appl. No.: 242,253

[22] Filed: Sep. 9, 1988

[51] Int. Cl.$^4$ .................. B64D 25/08; B64G 1/60
[52] U.S. Cl. .................. 244/122 AD; 89/1.34; 42/1.13; 102/262; 244/137.2; 244/162
[58] Field of Search ..... 244/122 A, 122 AB, 122 AC, 244/122 AD, 122 AE, 122 AH, 138 R, 141, 147, 162, 118.5, 137.2; 89/1.813, 1.34; 42/1.13; 102/262

[56] References Cited

U.S. PATENT DOCUMENTS

| | | | |
|---|---|---|---|
| 2,479,746 | 8/1949 | l'Anson | 244/137.2 |
| 2,510,843 | 6/1950 | Townshend | 244/147 |
| 2,900,874 | 8/1959 | Tjossem | 89/1.7 |
| 2,982,180 | 5/1961 | Hart | 89/1.5 |
| 3,355,127 | 11/1967 | Stanley et al. | 244/122 AD |
| 3,361,397 | 1/1968 | Valentine | 244/122 AD |
| 3,387,537 | 6/1968 | Chakoian et al. | 89/1.5 |
| 3,433,440 | 3/1969 | Stanley | 244/122 AD |
| 3,517,584 | 6/1970 | Robinson et al. | 89/1.5 |
| 3,841,590 | 10/1974 | Valentine | 244/122 AD |
| 3,847,329 | 11/1974 | Stanley | 244/122 AD |
| 3,861,625 | 1/1975 | Sadler et al. | 244/122 AD |
| 3,897,034 | 7/1975 | Stanley | 244/122 AD |
| 4,318,328 | 3/1982 | Rona | 89/1.815 |
| 4,397,433 | 8/1983 | Guitaut et al. | 244/137 R |

OTHER PUBLICATIONS

"Ranger Rocket Extraction System", Stencel Aero Engineering Corp., Talley Industries, Marketing Department, Stencel Aero Engineering Corp., P.O. Box 1107, Arden, North Carolina 28704.

Primary Examiner—Galen L. Barefoot
Attorney, Agent, or Firm—Russell E. Schlorff; John R. Manning; Edward K. Fein

[57] ABSTRACT

A method of effecting the in-flight departure of an astronaut from a shuttle craft, and apparatus therefor. A plurality of rocket assemblies with a lanyard for each are provided, although only one rocket assembly is used for one escape. The astronaut is carried in a parachute harness which is selectively connectible by the astronaut to one of the lanyards. A safety lever is moved when the astronaut pulls the lanyard. An ignition system is subsequently actuated when the lanyard is pulled further by the astronaut. Two rods push their corresponding rocket out through the side hatch of the shuttle craft. When the lanyard grows taut, one means fires the rocket. Subsequently, other means pull the parachute ripcord.

11 Claims, 4 Drawing Sheets

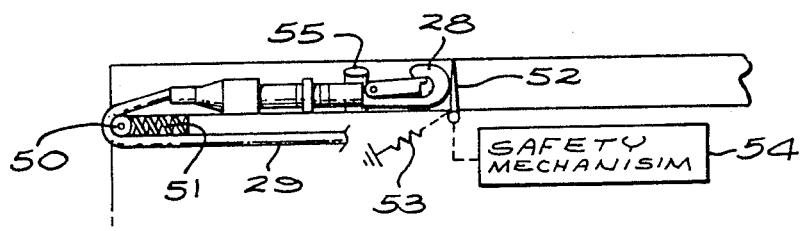
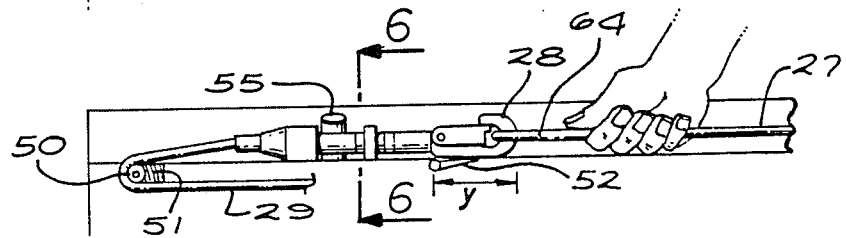
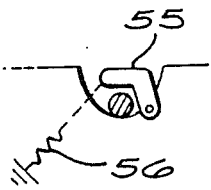
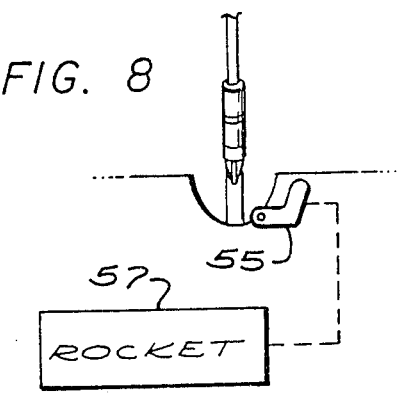
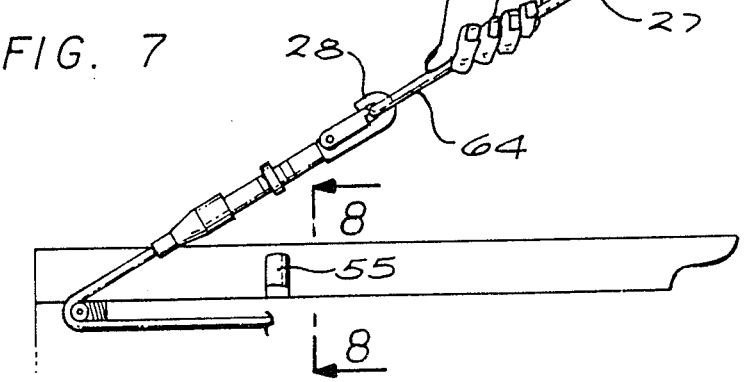

EMERGENCY EGRESS FIXED ROCKET PACKAGE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 U.S.C. 2457).

BACKGROUND OF THE INVENTION

1. Field of the Invention

In-flight crew escape systems have been considered for use when a space vehicle is unable to reach a landing site, and the flight crew determines that the chances of survival are better if they "bail-out" of the space vehicle prior to an abnormal landing. The in-flight crew escape system provides the flight crew with an alternative to water ditching or to landing on terrain other than a landing site with the crew remaining in a space vehicle due to the probability of minimal flight crew survival.

This invention relates to a method and apparatus for effecting a safe and rapid in-flight escape of the crew from the space vehicle. More particularly, an astronaut's exit is controlled by the astronaut by use of a lanyard connected to a rocket assembly. Rocket misfire is avoided by use of a safety device. At least one rocket assembly is provided for each member of the crew of the spacecraft. Should a rocket assembly fail, the astronaut can change connections from one rocket assembly to another.

The proposed mechanism is designed to remove the astronaut from a stricken space vehicle or aircraft. The device is designed to pull each astronaut safely past any aircraft empennage which they could strike if they jumped from the space vehicle or aircraft without assistance.

2. Background Art

Tractor rockets have been previously used to extract a person vertically from an aircraft or space vehicle when in a seated or standing position. These rockets have never been used, however, to extract a person horizontally form the vehicle. Additionally, other prior art devices utilized a rocket magazine concept, wherein the rockets were stacked vertically, and for each firing, a new rocket was dropped into place. Should one rocket or magazine mechanism fail, the remaining rockets were no longer usable.

U.S. Pat. No. 2,900,874 discloses a "turret 15" which selectively carries a number of rockets 10 from above to a location below the fuselage of an airplane in position for firing.

U.S. Pat. No. 2,982,180 discloses a launcher which is actuable to eject "several stores units either simultaneously or sequentially in a rearward direction".

U.S. Pat. No. 3,387,537 discloses a missile with a releasable band therearound. Release is effective through a trigger actuating wedge which is separated from the band by a parachute or a static line. This patent cites U.S. Pat. No. 2,816,119 as disclosing a releasable locking plate or key which is moved by a lanyard attached to an aircraft. The lanyard must be substantially vertical to remove the locking plate or key.

U.S. Pat. No. 3,517,584 discloses apparatus for ejecting high explosive stores and missiles from a carrier aircraft into the slip stream without materially affecting the velocity or altitude of the carrier aircraft during successive ejections of a plurality of missiles.

U.S. Pat. No. 4,318,328 discloses apparatus for aircraft to carry missiles in a manner such that they may be launched from the aircraft while the latter is in flight.

U.S. Pat. 4,397,433 discloses a magazine for carrying buoys while on board an aircraft, the magazine being rotatable to place successive buoys in positions to be jettisoned from the aircraft.

A sales brochure published under the title of "RANGER ROCKET EXTRACTION SYSTEM" by Stensel Arrow Engineering Corp., P.O. Box 1107, Arden, N.C., 20704 illustrates a tractor rocket escape system wherein a crew member is pulled from an aircraft.

SUMMARY OF THE INVENTION

It is therefore an object of this invention to provide an emergency egress system for an astronaut to leave an aircraft or spacecraft. In this invention, a mounting package, which includes a rocket and ignition system, is actuable to propel the rocket over an initial period of time before the rocket is actually fired. A lanyard has one end connected from the rocket assembly and a hook connected at the other end thereof. A D-ring coupled to the astronaut's harness is then placed on the hook. The astronaut can actuate the system by pulling the lanyard manually. In the actuated position, the astronaut lies on his back on a support adjacent to the side hatch of the space vehicle. The rocket then pulls the astronaut out of the side hatch of the space vehicle. A safety is provided to prevent inadvertent ignition system actuation.

BRIEF DESCRIPTION OF THE DRAWINGS

FIG. 4 is a diagrammatic view of a hook at the end of a lanyard in the fixed rocket package.

FIG. 5 is a diagrammatic view of the hook with the lanyard attached and the safety lever released.

FIG. 6 is a transverse sectional view taken on the line 6—6 shown in FIG. 5 illustrating an ignition system trigger arm.

FIG. 7 is a diagrammatic view of the hook being pulled manually upwardly and to the right to activate the trigger.

FIG. 8 is a transverse sectional view taken on the line 8—8 shown in FIG. 7 illustrating the trigger arm activated.

DETAILED DESCRIPTION OF THE PREFERRED EMBODIMENT

Figure 1:
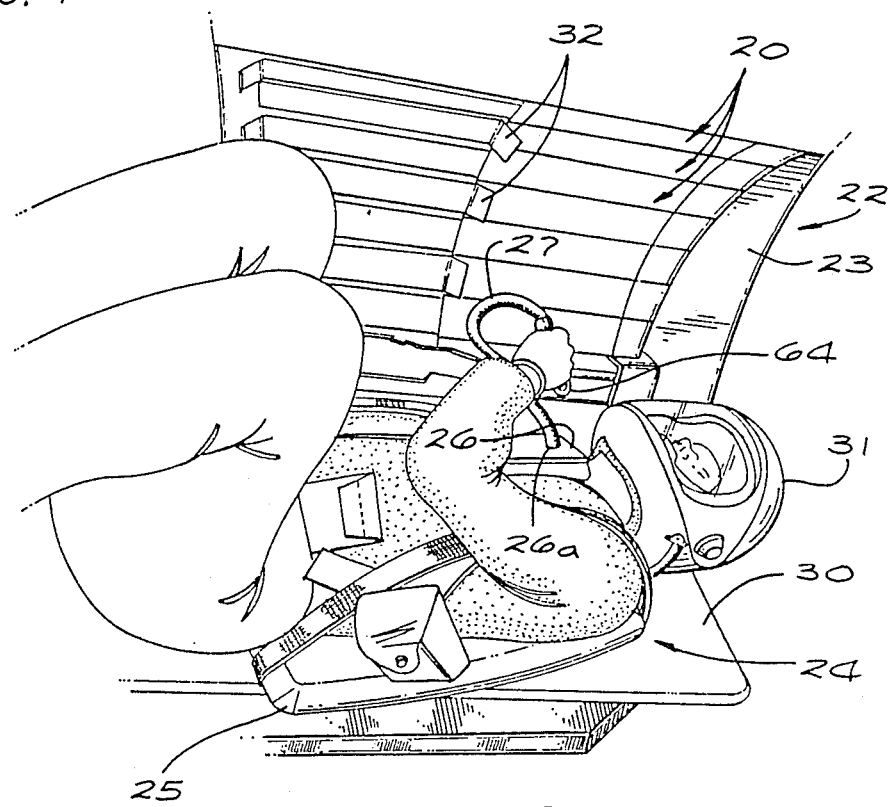
FIG. 1 is a perspective view of an astronaut in parachute harness inside a shuttle craft ready to exit head first through a side hatch.

20 As shown in FIG. 1, an astronaut 24 rests with his back on a horizontal back rest 30 that is fixed within a shuttlecraft 22 adjacent the lower portion of a side hatch 23. The astronaut's helmet 31 points abeam centrally through the opening of the side hatch 23. In this position, the astronaut is ready to actuate the system and be expelled from the spacecraft. A plurality of removable compartment covers 20 are provided, behind which rocket assemblies 21 (e.g. see FIGS. 2 and 3) are stowed. These compartments are fixed within the shuttlecraft 22.

The astronaut 24 is shown wearing a parachute 25 and a parachute harness (straps) 26. A cord 27 has one end fixed to the harness 26 at connection point 26a and the opposite end is connected to a D-ring 64. To actuate the system, astronaut 24 pulls one cover 20 off a corresponding compartment by grasping one of the tabs 32. This action, exposes a canister 63 (FIG. 2) in which a lanyard 29 having a hook 28 at one end thereof is stowed. Additional rockets 36 in each rocket assembly 21 are provided so that should one of the rockets 36 fail, the astronaut may grasp another cover tab 32 and select another lanyard.

Figure 2:
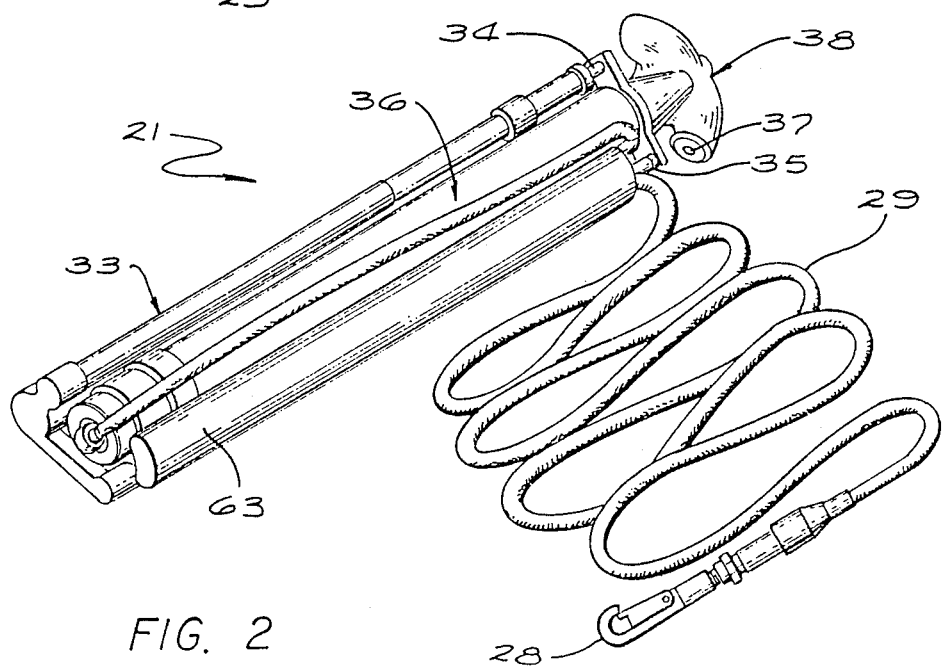
FIG. 2 is a perspective view of a rocket assembly and lanyard connected therefrom in accordance with the present invention.

As shown in FIG. 2, lanyard 29 is connected from the rocket assembly 21 and has the hook 28 connected at its free end. In the position shown in FIG. 2, the lanyard 29 is partially withdrawn from the canister 63. Responsive to actuation of the ignition system, a first rocket assembly rod 34 and a second rocket assembly rod 35 are thrust out to move the rocket 36 out of the side hatch 23 before the rocket is actually fired. Two tails of the rocket 36 emanate from two orifices 37 in a tee 38 when the rocket is fired.

Figure 3:
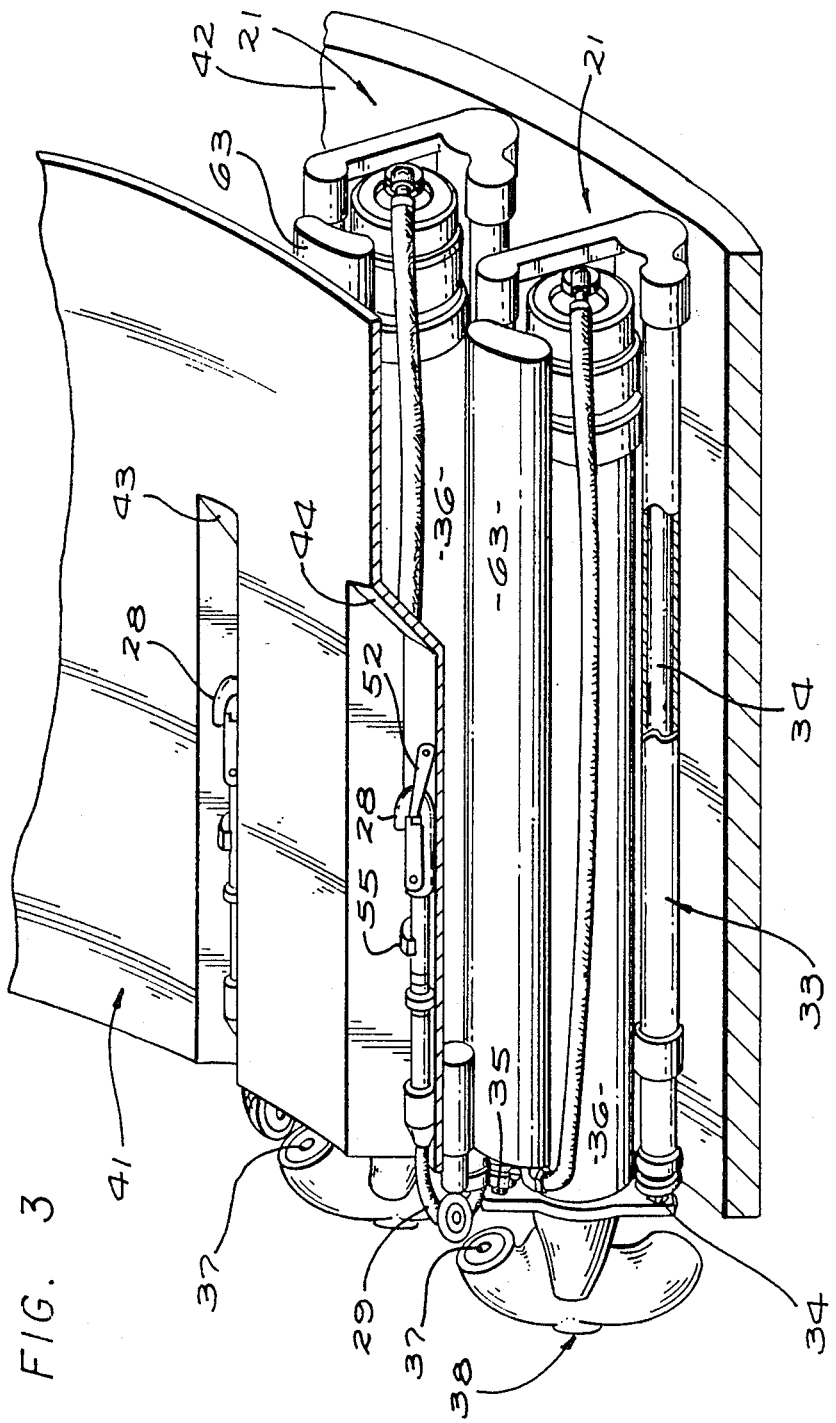
FIG. 3 is a perspective view of two rocket assemblies and lanyards connected therefrom between walls within a fixed rocket package. The rocket assemblies of FIG. 3 may each be identical to that of FIG. 2.

Referring now to FIG. 3, two rocket assemblies 21 are illustrated. All of the rocket assemblies are likewise fixed relative to the shuttlecraft 22 and to the enclosing walls 41 and 42. Recesses 43 and 44 are provided for the lanyard hooks 28 prior to the removal therefrom by the astronaut.

Referring now to FIG. 4, the lanyard 29 is shown curved around a sheeve 50 that is biased by a spring 51. A safety lever 52 prevents ignition until the hook 28 is moved by the astronaut to the position shown in FIG. 5. A spring 53 biases the safety lever 52. The safety lever 52 is connected to a safety mechanism 54 which inhibits actuation of the ignition system until the safety lever 52 is moved to the position shown in FIG. 5. Further note that in the position shown in FIG. 5, the sheeve 50 has moved and the spring 51 has been compressed.

Referring further to FIG. 5, the hook 28 has been pulled a distance "y" directly to the right in the drawing. This is accomplished manually by the astronaut.

Comparison of the positions of FIG. 7 and FIG. 5 will reveal that the ignition system actuation is accomplished by the astronaut 24 (once the safety lever 52 has been released), by raising hook 28 upward to the position shown in FIG. 7 until a trigger arm 55 moves from its position shown in FIG. 6 to its position shown in FIG. 8. A spring 56 biases the trigger arm 55 (FIG. 6). The trigger arm 55 (also shown in FIG. 3) operates to cause the rocket assembly rods 34 and 35 to be projected out of the side hatch 23.

Figure 9:
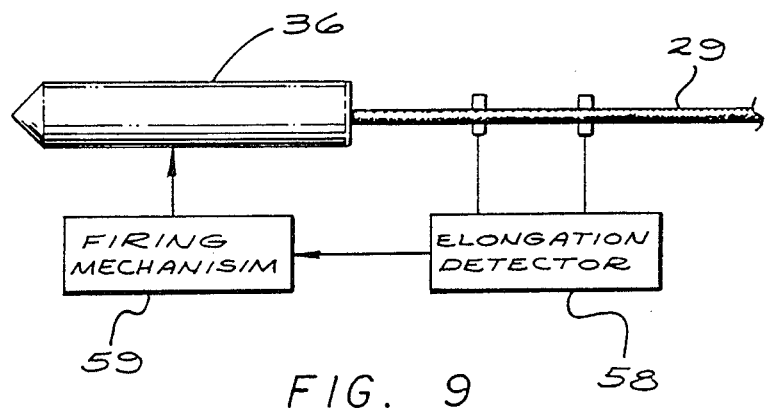
FIG. 9 is a block diagram of conventional apparatus for firing a rocket in accordance with the present invention.

Referring now to FIG. 9, the end of the lanyard 29 is schematically illustrated connected to the rocket 36. When the lanyard 29 becomes taut for the first time, the lanyard elongation detector 58 connected to the lanyard transmits a signal to the rocket 36 to fire by means of a conventional firing mechanism 59.

Figure 10:
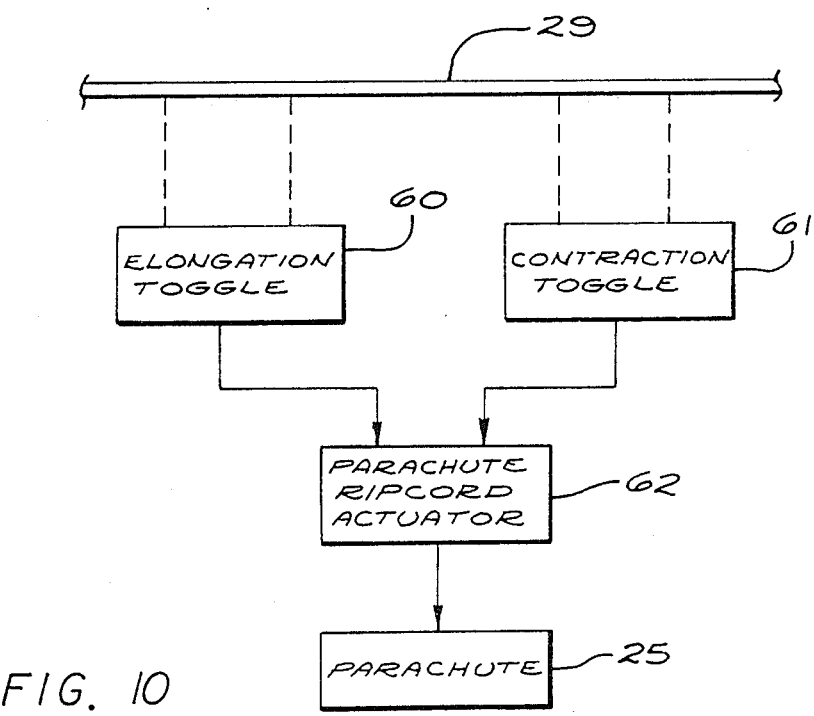
FIG. 10 is a block diagram of conventional apparatus for opening the astronauts's parachute.

Referring to FIG. 10, the lanyard 29 adjacent the astronaut is illustrated being connected to the parachute 25 through an elongation toggle 60 and a contraction toggle 61. The toggles 61 and 62 are both connected from lanyard 29 to a parachute ripcord actuator 62. Parachute ripcord actuator 62 in turn controls the opening of the parachute 25.

OPERATION

To actuate the system, the astronaut rips off one of the covers 20 (FIG. 1). Then the astronaut places the D-ring 64 on the hook 28. When the astronaut pulls the hook 28 a distance "y" (FIG. 5), the safety lever 52 is depressed. The astronaut then pulls hook 28 to a position shown in FIG. 7 to actuate the ignition system. Rocket assembly rods 34 and 35 then push rocket 36 out a distance until the lanyard 29 becomes taut. Once the lanyard 29 is taut, the elongation detector 58 actuates the firing mechanism 59 to fire the rocket 36. (The term "taut" is at least somewhat less than the maximum elongation.) Toggles 60 and 61 (FIG. 10) then cause the parachute 25 worn by the astronaut to open via the parachute ripcord actuator 62. Elongation toggle 60 detects the elongation before the end of the burn of the rocket. Contraction toggle 61 detects the lanyard contraction after the end of the burn. This conventional detection system thus prevents the parachute from opening due to premature lanyard contraction before the end of the burn.

I claim:

1. The method of effecting an in-flight departure of an astronaut from a shuttle craft, said method comprising the steps of: providing a harness for the astronaut; providing a ring connected with said harness; providing a rocket assembly including a rocket and two rods actuable to propel said rocket over an initial period of time before said rocket is fired; providing a lanyard having one end connected from said rocket assembly; providing a hook connected from the other end of said lanyard; connecting said ring to said hook; and pulling said lanyard to actuate said two rods.

2. The method of effecting an in-flight departure of an astronaut from a shuttle craft as set forth in claim 1, wherein said shuttle craft has a side hatch, wherein a back rest is provided crosswise of the shuttle craft and horizontal therein to support the astronaut while on his back with his head pointing outwardly of said shuttle craft side hatch, actuation of said two rods causing said lanyard to be stretched taut near the end of said initial period by momentum of said rocket assembly.

3. The method of effecting an in-flight departure of an astronaut from a shuttle craft as set forth in claim 2, wherein a plurality of said rocket assemblies are provided side by side, each of said rocket assemblies including a rocket and two rods actuable to propel the corresponding rocket an initial period of time before the corresponding rocket is ignited, a lanyard being provided for and connected from one end of each corresponding rocket assembly, a hook being provided and connected from the other end of each of said lanyards, said ring being connected to only one of said hooks, said ring being removable from said one of said hooks corresponding to one of said lanyards connected to one rocket assembly and reconnectible to another of said hooks in case the rods corresponding to one lanyard fail to function.

4. The method of effecting an in-flight departure of an astronaut from a shuttle craft as set forth in claim 3, wherein a safety lever is provided actuable to permit the rods of said one lanyard to be fired, said safety lever inhibiting action by the rods of said one lanyard when deactuated, actuation of said safety lever being accomplished by pulling said one lanyard in a direction approximately parallel to its rest position, a mechanical activator also being provided, and pulling upwardly and rearwardly on said lanyard to actuate said rods.

5. In in-flight departure gear for a shuttle craft and an astronaut to enable the astronaut to exit the shuttle craft, the shuttle craft having a side hatch, the combination comprising: means mounted in said shuttle craft including a horizontal surface to support said astronaut while on the astronaut's back with the astronaut's head pointing in a direction outwardly of said side hatch centrally thereof; a parachute including a harness for said astronaut to wear; a rocket assembly mounted in said shuttle craft including a rocket and two rods actuable to propel said rocket out of said side hatch over an initial period of time before said rocket is fired; a lanyard having one end connected to said rocket assembly; releasable means for connecting said parachute harness to the other end of said lanyard; and means responsive to pulling on said other lanyard end for actuating said two rods.

6. The combination as set forth in claim 5, wherein actuation of said two rods cause said lanyard to be stretched taut near the end of said initial period.

7. The combination as set forth in claim 6, wherein means are provided responsive to a predetermined lanyard strain for firing said rocket.

8. The combination as set forth in claim 7, wherein at least one rocket assembly is provided for each member of the crew, each said additional rocket assembly also having an additional lanyard with one end connected from said additional rocket assembly and another end connectable with a corresponding parachute harness.

9. The combination as set forth in claim 7, wherein said releasable means includes a D-ring on said parachute harness and a hook on each of said other lanyard ends, said D-ring being selectively connectable to either one of said hooks.

10. The combination as set forth in claim 5, wherein safety lever is mounted in said shuttle craft to inhibit actuation of said rods.

11. The combination as set forth in claim 10, wherein said safety lever is movable by pulling said lanyard to allow actuation of said two rods.

* * * * *